July 21, 1964     E. BARTRAM     3,141,253
AUTOMOBILE DRIVER'S SIGNALING DEVICE
Filed Aug. 21, 1961
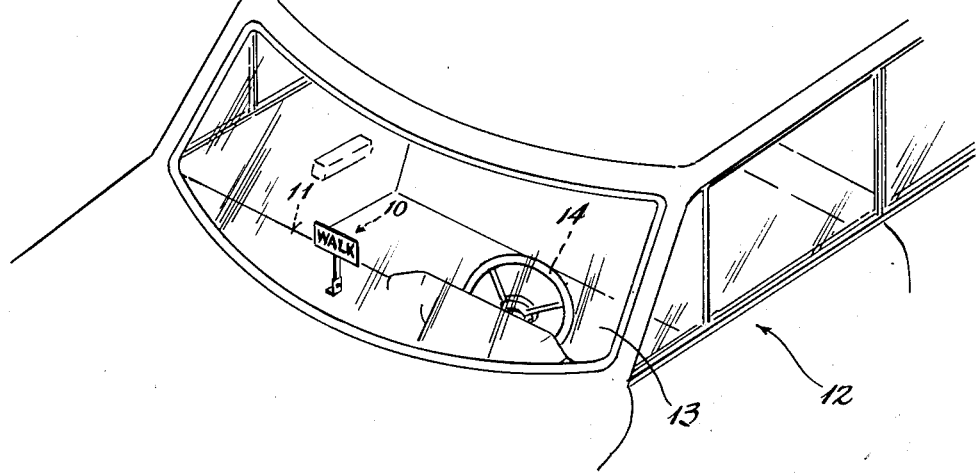
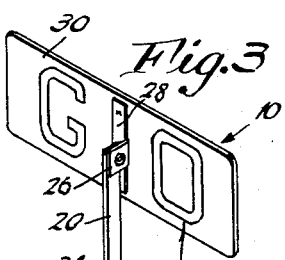
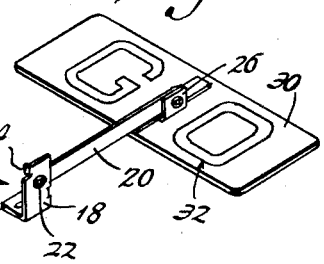
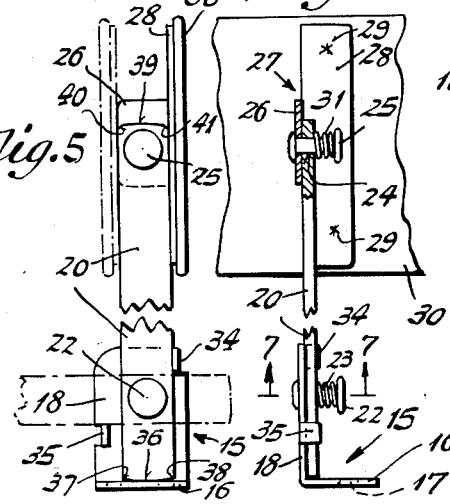
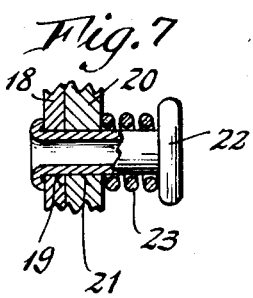
INVENTOR.
*Earl Bartram*
BY
*Johnson and Kline*
ATTORNEYS

United States Patent Office 3,141,253
Patented July 21, 1964

3,141,253
AUTOMOBILE DRIVER'S SIGNALING DEVICE
Earl Bartram, P.O. Box 1125, Bridgeport, Conn.
Filed Aug. 21, 1961, Ser. No. 132,675
3 Claims. (Cl. 40—129)

The present invention relates to a guide that may be mounted on an automobile in order to enable the automobile driver to suggest a course of action to nearby pedestrians or drivers of other vehicles.

In many instances, it is desirable that pedestrians and other vehicle drivers receive an indication of the action which a close by automobile is to take or to receive a suggestion from the automobile driver as to what action they should take. This is particularly true, for example, when pedestrians are crossing a street and the vehicle traffic light changes from "Stop" to "Go," rendering uncertain both to the pedestrians and the vehicle drivers what action each will take.

It is accordingly an object of the present invention to provide a guide that is secured to an automobile to be visible exteriorly thereof and which is operable by the automobile driver to indicate the action which the driver suggests to persons viewing the guide in order to eliminate any hazardous confusion therebetween.

A further object of the present invention is to provide a guide of the above type which includes indicia indicating more than one course of action and which is easily operated from one indicia to another and which when not in operation does not interfer with or obstruct the driver's vision or constitute a hazardous projection on the automobile.

A feature of the present invention resides in a guide for suggesting action which includes a mounting bracket that secures the guide to an automobile dashboard, slightly to the right of the driver. The bracket mounts an arm on which a substantially flat plate is mounted so that the plate may be moved from a vertical, exteriorly observable position to a horizontal, unobstructing position. On each side of the plate there are different indicia and by reason of the plate being pivotally mounted on the other end of the arm, it may be easily pivoted to have one side or the other thereof visible through the windshield to persons to which action is suggested. In the preferred form of the invention hereinafter disclosed, one indicia consists of the word "Walk" while the other indicia consists of the word "Go," these commands having been found to be quickly comprehensible and easily understood.

Other features and advantages will hereinafter appear.

In the drawing:

FIGURE 1 is a perspective view of the automobile driver's signaling device of the present invention shown secured on an automobile.

FIG. 2 is a perspective view of the device in its observable signaling position showing one indicia thereof.

FIG. 3 is a similar view showing the other indicia thereof.

FIG. 4 is a perspective view of the device in its non-signaling, inoperative position.

FIG. 5 is a side view showing enlarged the details of construction of the automobile driver's signaling device of the present invention.

FIG. 6 is a rear view somewhat enlarged of a portion thereof.

FIG. 7 is an enlarged section taken substantially on the line 7—7 of FIG. 6.

Referring to the drawing, the automobile driver's signaling device is generally indicated by the reference numeral 10 and as shown in FIG. 1 is preferably mounted on top of the instrument panel or a dashboard 11 of an automobile 12 to be easily exteriorly visible through the windshield 13. The device 10 is preferably mounted slightly to the right of the automobile steering wheel 14 in order to facilitate accessibility for operation by the automobile driver.

As shown in FIGS. 5, 6 and 7, the device 10 includes an L-shaped supporting bracket 15 having a horizontal leg 16 provided with securing means which, while other well-known securing devices may be employed such as suction cups, in the herein disclosed embodiment constitute apertures 17 through which screws or other fastening media may be used to mount the bracket to the dashboard 11. The other leg 18 extends upwardly at substantially right angles to the leg 16 and is provided with an aperture 19. Pivotally secured to the leg 18 is an arm 20 that is provided with an aperture 21 adjacent the lower end thereof. While the arm 20 and leg 18 may be pivotally secured by nuts and bolts, for example, passing through the apertures 19 and 21 in the invention herein described, a tubular rivet 22 is employed, the rivet head serving to hold a spring 23 under compression so that it exerts frictional pressure on the parts 18 and 20 to provide frictional resistance to movement therebetween.

The arm 20 adjacent its other end is also formed to provide an aperture 24 through which another tubular rivet 25 passes to provide a frictional pivotal support between the arm 20 and one leg 26 of a right angle bracket 27 having its other arm 28 secured as by spot welding 29 to a substantially flat plate 30. The pivotal connection includes a spring 31 held under compression for again providing frictional resistance to movement between the leg 26 and arm 20.

With the above construction and with the device 10 mounted on the dashboard, as shown in FIG. 1, during normal operation of the automobile, the device is folded to extend substantially horizontal and thus prevent obstructing the driver's vision. However, when desired to be employed by the driver to suggest action by persons viewing the device, the driver pivots the arm 20 from a horizonal to a vertical position and shows either the indicia 32, namely the word "Go" on one side through the windshield or pivots the plate 30 about the pivot to show the indicia 33, namely "Walk" on the other side.

The springs 23 and 31 provide friction for resisting movement of the device from the desired positions and in addition in order to define the vertical and horizontal positions of the arm 20, there is provided a vertical stop 34 on the leg 18 and a horizontal stop 35 similarly. While the stops may be formed by separate elements they are herein shown and preferably consist of bent-in portions of the bracket 15. Moreover, in carrying out the present invention in order to increase the resistance to movement of the plate and arm the bottom 36 edge of the arm 20 is designed to rub at the corners 37 and 38 with the top surface of the leg 16 as the bracket is moved from one position to the other. This similarly applies to the other end 39 of the arm which has corners 40 and 41 adapted to rub on the leg 28 when the plate is moved from one position to the other.

Preferably the letters employed to form both the indicia 32 and 33 are made from luminous material which is light reflecting in order to render the indicia more clearly visible to an observer. The background color for the indicia 33 is preferably red for the word "Walk" while the background color of the indicia 32 for the word "Go" is green to aid the observer to comprehend the suggested action and indicate the action which the automobile driver will take.

While reference has been made herein to an automobile, it is to be understood that this term is used generically to include trucks, buses and so forth wherein the present invention may also be employed to achieve the same results as in a motor car.

It will accordingly be appreciated that there has been disclosed an automobile driver's signaling device which may be employed to increase the safety of pedestrians and other vehicles by indicating to them action which they should take. The device is preferably mounted on the dashboard of an automobile to be easily accessible for operation by the driver to indicate the driver's suggestion and moreover in such a position be clearly visible through the automobile windshield to persons viewing the device. The device of the present invention includes a plurality of suggested indicia and its structure enables the driver to easily and quickly position the indicia which is desired to be observed.

Variations and modifications may be made within the scope of the claims and portions of the improvements may be used without others.

I claim:

1. An automobile driver's pedestrian guide comprising a supporting L-shaped bracket having one leg for securing and supporting the guide to and on an automobile, an arm pivoted at one end to the other leg of the bracket for movement between a horizontal non-observable position and a substantially vertical observable position, a guide comprising a substantially flat plate having indicia on one side and a different indicia on the other side, a second L-shaped bracket having two legs, means securing one leg of the second bracket to the guide, and means pivotally mounting the other end of the arm to the other leg of the second bracket for enabling pivotal movement of the guide to show in one direction one indicia or the other when the guide is in the vertical observable position.

2. The invention as defined in claim 1 in which the first-mentioned bracket includes stop means on its other leg engageable with the arm for limiting pivotal movement of the arm between its two positions.

3. The invention as defined in claim 1 in which the one end of the arm has corners positioned sufficiently proximate to the other leg to rub thereagainst upon pivotal movement of the arm.

References Cited in the file of this patent

UNITED STATES PATENTS

| | | |
|---|---|---|
| 1,665,180 | Schepman | Apr. 3, 1928 |
| 2,659,486 | Kurpin | Nov. 17, 1953 |
| 3,007,435 | Peterson | Nov. 7, 1961 |